United States Patent
Wigard et al.

(10) Patent No.: US 10,320,639 B2
(45) Date of Patent: Jun. 11, 2019

(54) METHOD OF CONTROLLING USER EQUIPMENT COMMUNICATION WITH A NETWORK AND CORRESPONDING APPARATUS AND COMPUTER PROGRAM PRODUCT

(71) Applicant: Nokia Solutions and Networks Oy, Espoo (FI)

(72) Inventors: Jeroen Wigard, Klarup (DK); Woonhee Hwang, Espoo (FI); Daniela Laselva, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 58 days.

(21) Appl. No.: 15/329,064

(22) PCT Filed: Aug. 8, 2014

(86) PCT No.: PCT/EP2014/067101
§ 371 (c)(1),
(2) Date: Jan. 25, 2017

(87) PCT Pub. No.: WO2016/020017
PCT Pub. Date: Feb. 11, 2016

(65) Prior Publication Data
US 2017/0214592 A1    Jul. 27, 2017

(51) Int. Cl.
*H04L 12/26*    (2006.01)
*H04W 48/18*    (2009.01)
(Continued)

(52) U.S. Cl.
CPC .......... *H04L 43/0811* (2013.01); *H04L 43/16* (2013.01); *H04W 24/08* (2013.01);
(Continued)

(58) Field of Classification Search
CPC .... H04L 43/0811; H04L 43/16; H04W 48/18; H04W 24/08; H04W 72/0486;
(Continued)

(56) References Cited

U.S. PATENT DOCUMENTS

2008/0108367 A1*  5/2008  Afrashteh ............. H04W 48/18
                                                        455/452.2
2009/0310562 A1   12/2009  Medapalli
(Continued)

FOREIGN PATENT DOCUMENTS

EP    2675223 A1    12/2013
EP    2757830 A1    7/2014
(Continued)

OTHER PUBLICATIONS

"New Work Item Proposal: WLAN/3GPP Radio Interworking", 3GPP TSG-RAN Working Group meeting #62, RP-132101, Agenda: 13.1.2, Intel Corporation, Dec. 3-6, 2013, 7 pages.
(Continued)

*Primary Examiner* — Ajay Cattungal
(74) *Attorney, Agent, or Firm* — Harrington & Smith

(57) ABSTRACT

There is provided a method comprising receiving first network connection information for at least one user equipment in a cell of a second network and using said connection information to determine whether to adjust at least one threshold value, said threshold value used to control user equipment communication with the first network.

19 Claims, 4 Drawing Sheets

(51) Int. Cl.
*H04W 24/08* (2009.01)
*H04W 72/04* (2009.01)
*H04W 72/08* (2009.01)
*H04W 84/04* (2009.01)
*H04W 84/12* (2009.01)
*H04W 88/02* (2009.01)

(52) U.S. Cl.
CPC ....... *H04W 48/18* (2013.01); *H04W 72/0486* (2013.01); *H04W 72/08* (2013.01); *H04W 84/042* (2013.01); *H04W 84/12* (2013.01); *H04W 88/02* (2013.01)

(58) Field of Classification Search
CPC ... H04W 72/08; H04W 84/042; H04W 84/12; H04W 88/02
See application file for complete search history.

(56) References Cited

U.S. PATENT DOCUMENTS

| | | | |
|---|---|---|---|
| 2009/0316581 A1* | 12/2009 | Kashyap | H04L 45/28 370/236 |
| 2012/0322447 A1 | 12/2012 | Ramachandran et al. | |
| 2014/0003254 A1* | 1/2014 | Andreoli-Fang | H04W 28/02 370/252 |
| 2014/0003263 A1* | 1/2014 | Sheriff | H04W 36/30 370/252 |
| 2014/0003342 A1* | 1/2014 | Sheriff | H04W 36/24 370/328 |
| 2015/0098462 A1* | 4/2015 | Ku | H04L 29/06176 370/352 |
| 2016/0007084 A1* | 1/2016 | Kim | H04L 65/4084 725/30 |

FOREIGN PATENT DOCUMENTS

| | | |
|---|---|---|
| JP | WO-2014112599 A1 | 1/2017 |
| WO | 2000/016578 A1 | 3/2000 |

OTHER PUBLICATIONS

"Further details on WLAN/3GPP interworking signaling", 3GPP TSG-RAN Working Group 2 meeting #86, R2-142479, Agenda: 5.1.2, Nokia Corporation, May 19-23, 2014, 3 pages.

International Search Report and Written Opinion received for corresponding Patent Cooperation Treaty Application No. PCT/EP2014/067101, dated Apr. 29, 2015, 12 pages.

"Use case for UE based and network based traffic offload based on user plane congestion in the RAN", 3GPP TSG-SA Working Group 1 meeting #59, S1-122403, Agenda: UPCON/BeMoTo, InterDigital Communications, Jul. 30-Aug. 3, 2012, 4 pages.

* cited by examiner

METHOD OF CONTROLLING USER EQUIPMENT COMMUNICATION WITH A NETWORK AND CORRESPONDING APPARATUS AND COMPUTER PROGRAM PRODUCT

RELATED APPLICATION

This application was originally filed as PCT Application No. PCT/EP2014/067101 filed Aug. 8, 2014.

The present application relates to a method, apparatus and system and in particular but not exclusively, network operator assisted connectivity over a second network.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases. The aim of the standardization is to achieve a communication system with, inter alia, reduced latency, higher user data rates, improved system capacity and coverage, and reduced cost for the operator.

In a first aspect there is provided a method comprising receiving first network connection information for at least one user equipment in a cell of a second network and using said connection information to determine whether to adjust at least one threshold value, said threshold value used to control user equipment communication with the first network.

Said threshold value may be used in initiating a connection with the first network or traffic routing of a connection with the second network.

Said connection information may comprise connection quality information.

Said connection information may comprise at least one of the time the at least one user equipment is connected to the first network, network identification information, node identification information, channel quality information, channel utilization information and information indicating why a connection to the first network was terminated.

The method may comprise determining the time the at least one UE is connected to the first network in dependence on the first network connection information.

Said connection information may comprise information that a user equipment is connected to the first network, and the method may comprise monitoring whether the at least one user equipment connects to the second network.

The method may comprise using said connection information to determine if a trigger condition is met.

He method may comprise adjusting said threshold value if said trigger condition is met.

Said trigger condition may comprise a time period during which at least one user equipment is connected with the first network.

Said time period may a predetermined time period.

The method may comprise adjusting said threshold value by a discrete amount.

The method may comprise causing an adjusted threshold value to be sent to at least one user equipment in the cell of the second network.

The threshold value may relate to at least one of first and second network signal quality, first and second network signal strength and first and second network load level.

The first network may be a wireless local area network and the second network may be a cellular network.

In a second aspect there is provided a method comprising causing first network connection information to be sent to a base station of a second network in response to a request from the base station of the second network, said connection information to be used to determine whether to adjust a threshold value, said threshold value used to control user equipment communication with the first network.

The method may comprise receiving an adjusted threshold.

The method may comprise using said adjusted threshold in determining whether to initiate a connection with a first network or traffic routing of a connection with the second network.

The method may comprise causing first network connection information to be sent when a user equipment initiates a connection to the second network.

The method may comprise causing first network connection information to be sent when a user equipment initiates, within a predetermined time period, a connection to the second network after a connection to the first network was established.

Said connection information may comprise connection quality information.

Said connection information may comprise at least one of the time the at least one user equipment is connected to the first network, network identification information, node identification information, channel quality information, channel utilization information and information indicating why a connection to the first network was terminated.

Said connection information may comprise information that a user equipment is connected to the first network.

The threshold value may relate to at least one of first and second network signal quality, first and second network signal strength and first and second network load level.

The first network may be a wireless local area network and the second network may be a cellular network.

In a third aspect there is provided an apparatus, said apparatus comprising means for receiving first network connection information for at least one user equipment in a cell of a second network and means for using said connection information to determine whether to adjust at least one threshold value, said threshold value used to control user equipment communication with the first network.

Said threshold value may be used in initiating a connection with the first network or traffic routing of a connection with the second network.

Said connection information may comprise connection quality information.

Said connection information may comprise at least one of the time the at least one user equipment is connected to the first network, network identification information, node identification information, channel quality information, channel utilization information and information indicating why a connection to the first network was terminated.

The apparatus may comprise means for determining the time the at least one UE is connected to the first network in dependence on the first network connection information.

Said connection information may comprise information that a user equipment is connected to the first network, and the method may comprise monitoring whether the at least one user equipment connects to the second network.

The apparatus may comprise means for using said connection information to determine if a trigger condition is met.

The apparatus may comprise means for adjusting said threshold value if said trigger condition is met.

Said trigger condition may comprise a time period during which at least one user equipment is connected with the first network.

Said time period may a predetermined time period.

The apparatus may comprise means for adjusting said threshold value by a discrete amount.

The apparatus may comprise means for causing an adjusted threshold value to be sent to at least one user equipment in the cell of the second network.

The threshold value may relate to at least one of first and second network signal quality, first and second network signal strength and first and second network load level.

The first network may be a wireless local area network and the second network may be a cellular network.

In a fourth aspect there is provided an apparatus, said apparatus comprising means for causing first network connection information to be sent to a base station of a second network in response to a request from the base station of the second network, said connection information to be used to determine whether to adjust a threshold value, said threshold value used to control user equipment communication with the first network.

The apparatus may comprise means for receiving an adjusted threshold.

The apparatus may comprise means for using said adjusted threshold in determining whether to initiate a connection with a first network or traffic routing of a connection with the second network.

The apparatus may comprise means for causing first network connection information to be sent when a user equipment initiates a connection to the second network.

The apparatus may comprise means for causing first network connection information to be sent when a user equipment initiates, within a predetermined time period, a connection to the second network after a connection to the first network was established.

Said connection information may comprise connection quality information.

Said connection information may comprise at least one of the time the at least one user equipment is connected to the first network, network identification information, node identification information, channel quality information, channel utilization information and information indicating why a connection to the first network was terminated.

Said connection information may comprise information that a user equipment is connected to the first network.

The threshold value may relate to at least one of first and second network signal quality, first and second network signal strength and first and second network load level.

The first network may be a wireless local area network and the second network may be a cellular network.

In a fifth aspect there is provided an apparatus, said apparatus comprising at least one processor, and at least one memory including computer program code, the at least one memory and the computer program code configured to, with the at least one processor, cause the apparatus at least to receive first network connection information for at least one user equipment in a cell of a second network and use said connection information to determine whether to adjust at least one threshold value, said threshold value used to control user equipment communication with the first network.

Said threshold value may be used in initiating a connection with the first network or traffic routing of a connection with the second network.

Said connection information may comprise connection quality information.

Said connection information may comprise at least one of the time the at least one user equipment is connected to the first network, network identification information, node identification information, channel quality information, channel utilization information and information indicating why a connection to the first network was terminated.

The apparatus may be configured to determine the time the at least one UE is connected to the first network in dependence on the first network connection information.

Said connection information may comprise information that a user equipment is connected to the first network, and the method may comprise monitoring whether the at least one user equipment connects to the second network.

The apparatus may be configured to said connection information to determine if a trigger condition is met.

The apparatus may be configured to adjust said threshold value if said trigger condition is met.

Said trigger condition may comprise a time period during which at least one user equipment is connected with the first network.

Said time period may a predetermined time period.

The apparatus may be configured to adjust said threshold value by a discrete amount.

The apparatus may be configured to cause an adjusted threshold value to be sent to at least one user equipment in the cell of the second network.

The threshold value may relate to at least one of first and second network signal quality, first and second network signal strength and first and second network load level.

The first network may be a wireless local area network and the second network may be a cellular network.

In a sixth aspect there is provided an apparatus, said apparatus comprising at least one processor and at least one memory including computer program code, the at least one memory and the computer program code configured to, with the at least one processor, cause the apparatus at least to cause first network connection information to be sent to a base station of a second network in response to a request from the base station of the second network, said connection information to be used to determine whether to adjust a threshold value, said threshold value used to control user equipment communication with the first network.

The apparatus may be configured to receive an adjusted threshold.

The apparatus may be configured to use said adjusted threshold in determining whether to initiate a connection with a first network or traffic routing of a connection with the second network.

The apparatus may be configured to cause first network connection information to be sent when a user equipment initiates a connection to the second network.

The apparatus may be configured to cause first network connection information to be sent when a user equipment initiates, within a predetermined time period, a connection to the second network after a connection to the first network was established.

Said connection information may comprise connection quality information.

Said connection information may comprise at least one of the time the at least one user equipment is connected to the first network, network identification information, node identification information, channel quality information, channel utilization information and information indicating why a connection to the first network was terminated.

Said connection information may comprise information that a user equipment is connected to the first network.

The threshold value may relate to at least one of first and second network signal quality, first and second network signal strength and first and second network load level.

The first network may be a wireless local area network and the second network may be a cellular network.

In a seventh aspect there is provided a computer program comprising computer executable instructions which when run on one or more processors perform the method of the first aspect.

In the above, many different embodiments have been described. It should be appreciated that further embodiments may be provided by the combination of any two or more of the embodiments described above.

Before explaining in detail the examples, certain general principles of a wireless communication system and mobile communication devices are briefly explained with reference to FIGS. 1 to 2 to assist in understanding the technology underlying the described examples.

Figure 1:
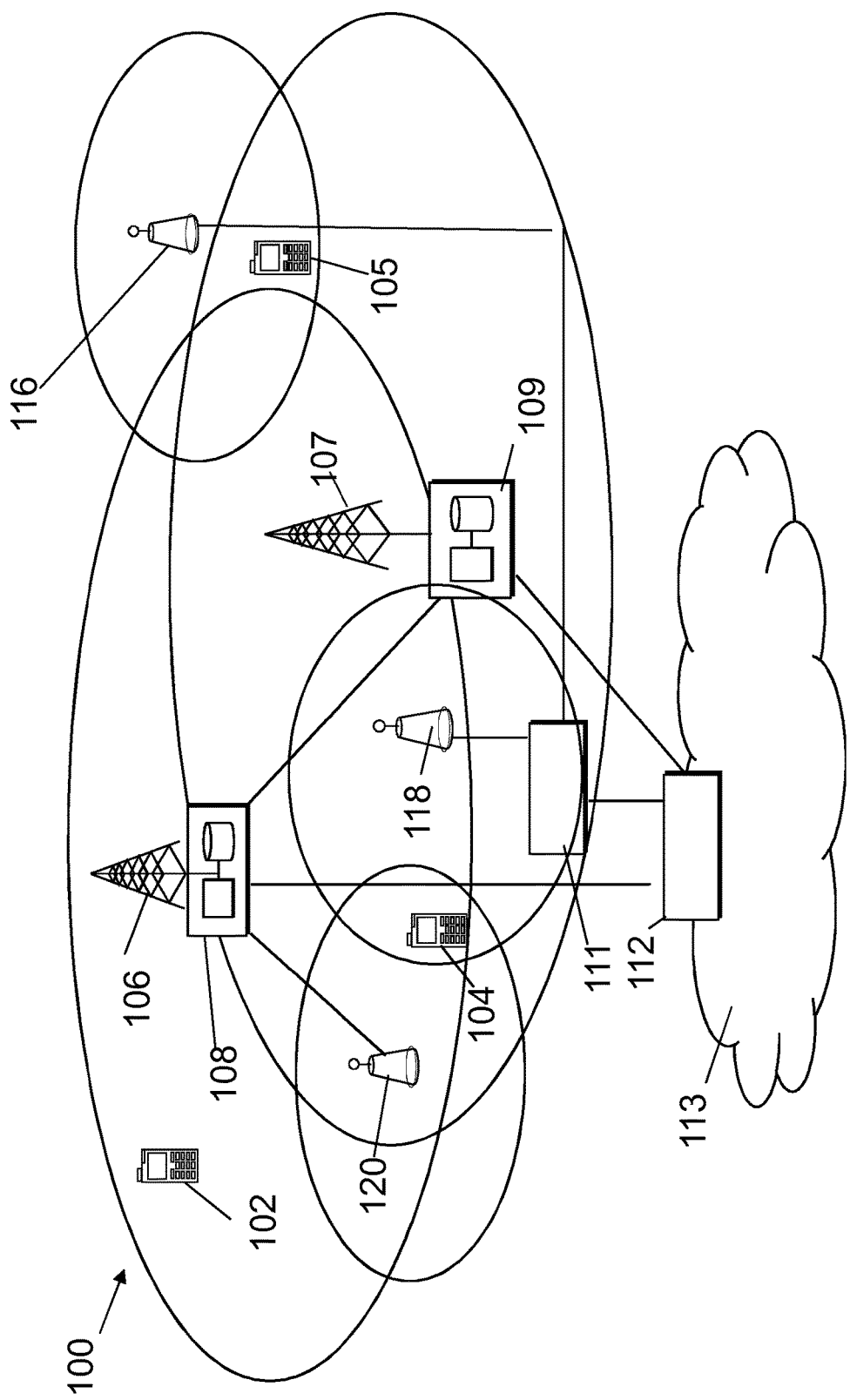
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
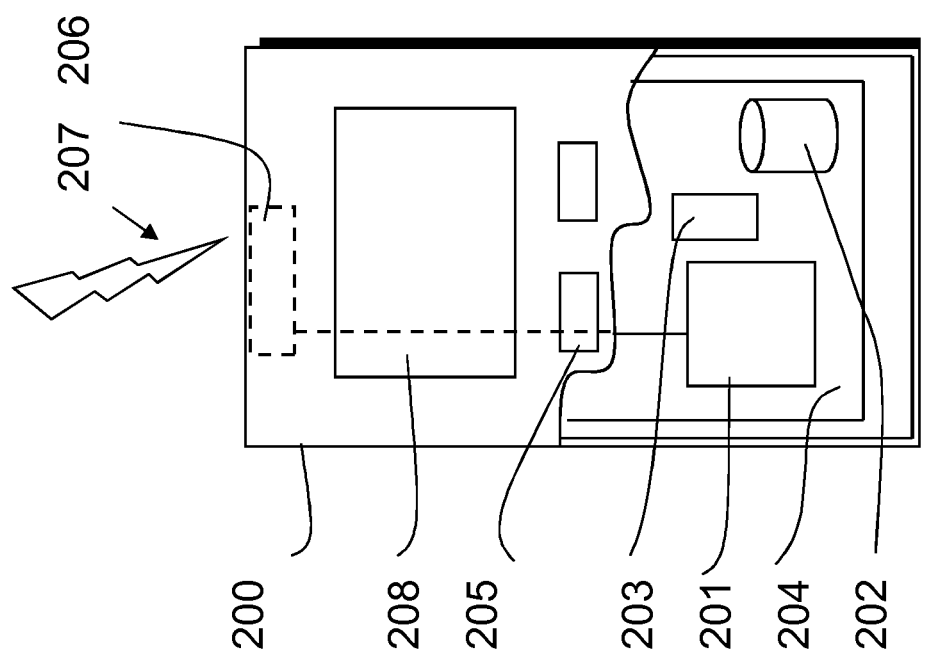
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Mobile Network Operators (MNOs) may deploy Wireless Local Area Network (WLAN), which may be carrier-grade, as a complementary system to cellular networks. Network-controlled load balancing between cellular and WLAN systems may improve network performance and user experience.

In RAN interworking, such as 3GPP and WLAN interworking, both network selection, at the start of a new connection, and traffic routing, during an existing connection, may be supported and governed by rules. These rules may be RAN defined rules or ANDSF (Access Network Discovery and Selection Function) rules. RAN interworking may rely on various thresholds, which may be part of RAN assistance information. The thresholds may be used by the UE when evaluating offloading/onloading conditions, using, rules as discussed above. Offloading describes the attempt to move traffic from a first network, such as a cellular communication network, to a second network, e.g. WLAN, and onloading describes the attempt to move traffic from the second network to the first network. The above definitions for offload and onload are based on the understanding that normal radio services will be handled through a network that the mobile operator has full control over, for example, a radio access network (RAN). The definitions for onload and offload may differ depending on the networks involved.

The above-mentioned thresholds may relate to the RAN and WLAN signal strength, signal quality and/or load level. Any threshold can be signaled to UEs in both idle and connected mode by using broadcast messages (SIB) from the RAN. In addition, or alternatively, UEs in connected mode may receive any of the thresholds via dedicated signalling (RRC signalling).

Radio enhancements to cellular network and WLAN interworking with the goal to support operator assisted connectivity over WLAN along with UE predictability are being discussed. Providing a complementing mechanism and a dynamic extension to existing Access Network Discovery and Selection Function (ANDSF) functionalities is being considered.

A RAN may signal RAN assistance thresholds for the purpose of WLAN interworking to a UE. The UE can evaluate whether to offload/onload its traffic to an available WLAN access point based on the comparison of a measurement against the corresponding threshold, whenever the threshold is provided. For instance, a UE will offload traffic to WLAN if measured reference signal received power (RSRP)<RSRP threshold and WLAN is available. Other measurements which may be used include WLAN channel utilization threshold, uplink (UL) and downlink (DL) WLAN backhaul rate, received channel power indicator (RCPI), received signal to noise indicator (RSNI), reference signal received quality (RSRQ), received signal code power (RSCP) and carrier to noise ratio (EcNo). RAN can signal thresholds for those measurements. Any other suitable channel quality measurements may be used.

A common set of thresholds broadcast in SIB may be used by all UEs in a cell broadcast region. In addition an operator may be allowed to override any of the parameters for specific UEs with dedicated RRC signalling.

The method described above helps offloading traffic, but it may be challenging to set the thresholds correctly, as a RAN may not be aware of how many UEs are within the coverage area of a WiFi network and can be offloaded.

It may happen that the user throughput is worse in the WLAN (at times when the WLAN is rather loaded for instance) when the UE is steered to the WLAN and is at the coverage border of the WLAN. For example, WLAN load metrics, e.g. BSS (basic service set) load and backhaul data rate, may not be used for enhancing ANDSF rules. A typical user behaviour in that case is to switch off the WiFi in the phone, which will make the UE return to the cellular network.

Thresholds may be pushed to a UE. These parameters are assumed to be set by the RAN. It can be challenging to set optimal thresholds. SON mechanisms to tune the WLAN RSSI and LTE RSRP thresholds have been considered. However, those solutions assume extensive WLAN coverage (for example where WiFi APs are collocated with LTE micro cells) and do not react upon the lack of a WLAN network.

Figure 3:
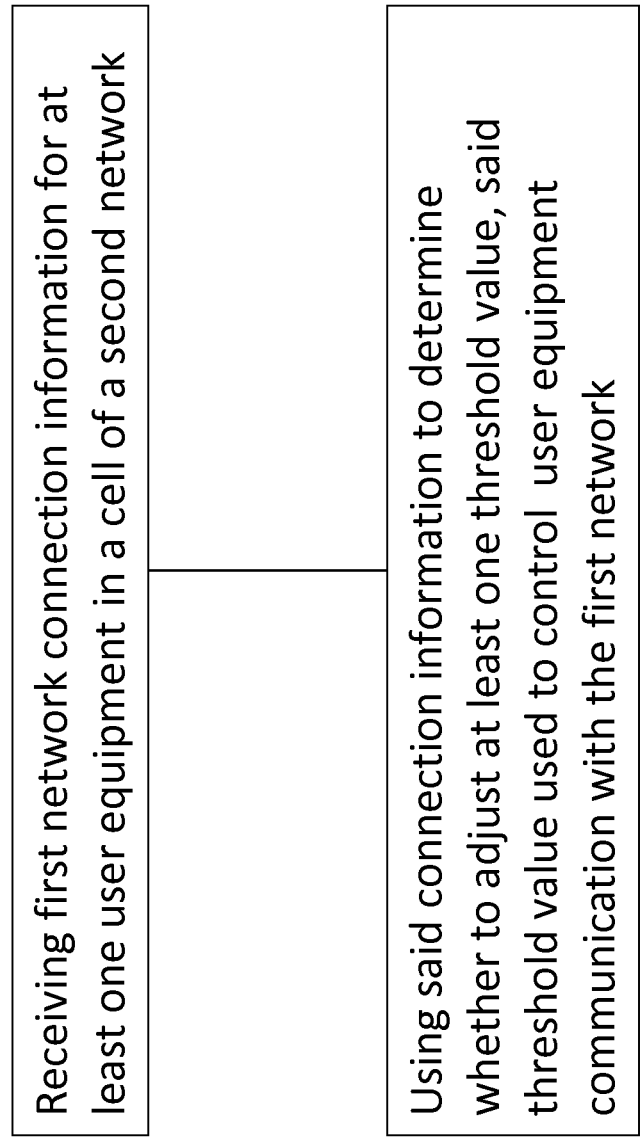
FIG. 3 shows a flow chart of a method of dynamically adjusting thresholds.

FIG. 3 shows a method of dynamically adjusting thresholds. The thresholds which are sent to the UE may be automatically adjusted by the network when it is detected that the settings are not optimal. In a first step, first network connection information for at least one UE in a cell of a second network is received.

The first step comprises detecting that thresholds are not optimal. The first network connection information may be received from a UE. The first network may be a WLAN and the second network may be a cellular network such as a RAN. First network connection information provides an indication of the quality of the connection to the first network. First network connection information may comprise the time the at least one UE is connected to the first network. Alternatively, or in addition, the RAN may monitor which UEs move to a WLAN. The UE may signal to the RAN when it moves to WLAN. RAN may send this information to a core network (CN) node, such as an MME. The CN or MME may store in a memory which UEs have been moving to the WLAN. The CN or MME may also monitor if and/or when these UEs return to RAN. Alternatively, the UE may report the time it has spent on WLAN when it returns to the cellular network. The UE may report that it has left WLAN as soon as it comes back to a cellular within a predetermined time period after it left for WLAN. The UE may piggyback the required information in control information messages. The UE may include the required information in a dedicated message or may split the information across a number of messages. Alternatively a message could be standardized. For instance, a UE which, after being steered to WLAN, moves to the idle state may signal the information during the connection setup phase in a message indicating the connection setup is complete, for example, a RRCConnectionSetupComplete message, or may indicate the existence of the information in the message indicating the connection setup is complete.

The network may configure the UE to report the connection information. The UE may then report such connection information at any time its connection towards WLAN is ended. Alternatively the report may be sent on the condition that the UE has been steered to WLAN, left WLAN and attempted to reconnect to LTE within a predetermined time period, e.g. timer x signaled by RAN. This way only relevant reports may be sent which may result in increased conservation of UE battery.

The first network connection information may comprise further information. For example, a UE may report the reason it left the WLAN. For example, the UE may report that the received QoS in WLAN was not good enough, the WLAN radio has been lost, the RAN asked the UE to return, etc.) The UE may report the reason it began association with the WLAN, for example if the UE was RAN commanded to associate with the WLAN, the UE associated with the WLAN under ANDSF rules with a RAN parameter and/or user preference. Information regarding the first network, e.g. WLAN, may be provided in the first network connection information. Such information may include network identification information, node identification information, channel quality information, channel utilization information and information indicating why a connection to the first network was terminated for example, the information may include SSID (service set identification) and/or BSS load.

In a second step, first network connection information may be used to determine whether to adjust a threshold value said threshold value used in determining whether a user equipment is to initiate a connection with the first network. For example, if a certain number of UEs return to RAN within a predetermined time period after they left to WLAN, the MME may trigger adjustment of thresholds such that they are more conservative, that is such that the UEs are less likely to offload to the WLAN. Alternatively, thresholds may be adjusted so that they are more aggressive, such that the UE is more likely to offload to WLAN. The thresholds may be adjusted so that they are more aggressive if the trigger condition is not met. The number of UEs can be as low as one. The predetermined time period may be up to ten minutes and may be between 5 and 10 minutes.

The threshold may be adjusted by a discrete amount. For the adjustment of the thresholds core network node, for example an MME, may signal to the RAN, for example an eNB, that the thresholds need to be adjusted. The MME may signal threshold adjustment, for example, using a MME Configuration Update message, MME Direct Information Transfer or a DL S1 message. The following messages may be included in the signalling from the core network to the RAN: signalling from RAN to CN indicating which UEs have left the system to WLAN and/or signalling from CN to RAN to adjust the thresholds, i.e. an indication that the thresholds should be increased or reduced.

The adjusted thresholds may be signalled to UEs. The adjusted thresholds may be indicated to the UE using broadcast signalling, e.g. SIBs, or dedicated signalling, for example RRC signalling. The thresholds may be sent to all the UEs in a cell broadcast region.

The above method may lead to improved offloading. Users, who with too aggressive offloading would suddenly experience a lower throughput, may not be offloaded as often and therefore the overall quality of experience will increase.

It should be understood that each block of the flowchart of FIG. 3 and any combination thereof may be implemented by various means or their combinations, such as hardware, software, firmware, one or more processors and/or circuitry.

Figure 4:
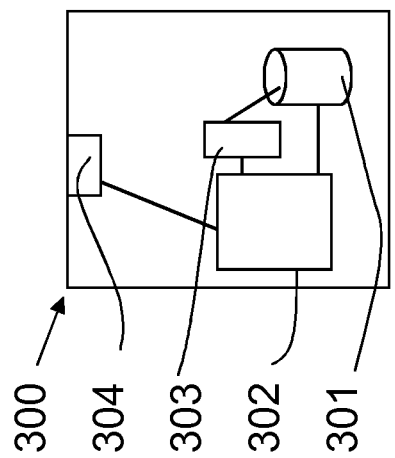
FIG. 4 shows a schematic diagram of an example control apparatus.

The method may be implemented on a control apparatus as shown in FIG. 4. FIG. 4 shows an example of a control apparatus for a communication system, for example to be coupled to and/or for controlling a station of an access system, such as a base station or (e) node B, or a node of a core network such as an MME, or a server or host. The method may be implemented in the MME or a related element in the core network, or any other suitable element in which the ID of a UE is known. The method may be implanted in a single control apparatus or across more than one control apparatus. The control apparatus may be integrated with or external to a node or module of a core network. In some embodiments, base stations comprise a separate control apparatus unit or module. In other embodiments, the control apparatus can be another network element such as a radio network controller or a spectrum controller.

In some embodiments, each base station may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 109 can be configured to execute an appropriate software code to provide the control functions.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 3GPP and WLAN, similar principles can be applied in relation to other cellular networks and wireless local area networks and to any other communication system where support operative assisted connectivity over another network is used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
    receiving first network connection information for at least one user equipment in a cell of a second network; and
    using said first network connection information to determine whether to adjust at least one threshold value, said threshold value used to control user equipment communication with a first network, wherein said first network connection information comprises at least one of a time the at least one user equipment is connected to the first network, network identification information, node identification information, channel utilization information or information indicating why a connection to the first network was terminated.

2. The method according to claim 1, wherein said threshold value is used in initiating a connection with the first network or traffic routing of a connection with the second network.

3. The method according to claim 1, wherein said first network connection information comprises connection quality information.

4. The method according to claim 1, comprising determining the time the at least one UE is connected to the first network in dependence on the first network connection information.

5. The method according to claim 4, wherein the first network connection information comprises information that a user equipment is connected to the first network, and comprising monitoring whether the at least one user equipment connects to the second network.

6. The method according to claim 1, comprising using said first network connection information to determine if a trigger condition is met.

7. The method according to claim 6, wherein said trigger condition comprises a predetermined time period during which at least one user equipment is connected with the first network.

8. The method according to claim 1, comprising adjusting said threshold value by a discrete amount.

9. The method according to claim 1, comprising causing an adjusted threshold value to be sent to at least one user equipment in the cell of the second network.

10. The method according to any preceding claim 1, wherein the threshold value relates to at least one of first and second network signal quality, first and second network signal strength and first or second network load level.

11. The method according to any preceding claim 1, wherein the first network is a wireless local area network and the second network is a cellular network.

12. The method according to claim 1, further comprising:
determining whether a predetermined number of user equipment have returned to the first network within a predetermined time period after the predetermined number of user equipment left to the second network; and
triggering adjustment of the at least one threshold value, such that at least one subsequent user equipment are less likely to offload to the second network.

13. The method according to claim 1, wherein the first network connection information further comprises channel quality information.

14. An apparatus, said apparatus comprising:
at least one processor;
and at least one non-transitory memory including computer program code;
the at least one non-transitory memory and the computer program code configured to, with the at least one processor, cause the apparatus at least to:
receive first network connection information for at least one user equipment in a cell of a second network; and
use said first network connection information to determine whether to adjust at least one threshold value, said threshold value used to control user equipment communication with a first network, wherein said first network connection information comprises at least one of a time the at least one user equipment is connected to the first network, network identification information, node identification information, channel utilization information or information indicating why a connection to the first network was terminated.

15. An apparatus, said apparatus comprising:
at least one processor;
and at least one non-transitory memory including computer program code;
the at least one non-transitory memory and the computer program code configured to, with the at least one processor, cause the apparatus at least to:
cause first network connection information to be sent to a base station of a second network in response to a request from the base station of the second network, said connection information to be used to determine whether to adjust a threshold value, said threshold value used to control user equipment communication with a first network, wherein said first network connection information comprises at least one of a time the at least one user equipment is connected to the first network, network identification information, node identification information, channel utilization information or information indicating why a connection to the first network was terminated.

16. The apparatus according to claim 15, wherein the at least one non-transitory memory and the computer program code further configured to, with the at least one processor, cause the apparatus at least to: receive an adjusted threshold.

17. The apparatus according to claim 16, wherein the at least one non-transitory memory and the computer program code further configured to, with the at least one processor, cause the apparatus at least to:
use said adjusted threshold in determining whether to initiate a connection with a first network or traffic routing of a connection with the second network.

18. The apparatus according to claim 15, wherein the at least one non-transitory memory and the computer program code further configured to, with the at least one processor, cause the apparatus at least to:
cause first network connection information to be sent when a user equipment initiates a connection to the second network.

19. The apparatus according to claim 18, wherein the at least non-transitory one memory and the computer program code further configured to, with the at least one processor, cause the apparatus at least to:
cause first network connection information to be sent when a user equipment initiates, within a predetermined time period, a connection to the second network after a connection to the first network was established.

* * * * *

UNITED STATES PATENT AND TRADEMARK OFFICE
CERTIFICATE OF CORRECTION

PATENT NO. : 10,320,639 B2
APPLICATION NO. : 15/329064
DATED : June 11, 2019
INVENTOR(S) : Jeroen Wigard, Woonhee Hwang and Daniela Laselva Page 1 of 1

It is certified that error appears in the above-identified patent and that said Letters Patent is hereby corrected as shown below:

In the Claims

In Claim 10:
Column 13, Line 16, "and first or second" should be deleted and --or first and second-- should be inserted.

Signed and Sealed this
Twenty-third Day of July, 2019

Andrei Iancu
*Director of the United States Patent and Trademark Office*